United States Patent
Ando et al.

(10) Patent No.: US 7,024,856 B2
(45) Date of Patent: Apr. 11, 2006

(54) VARIABLE NOZZLE CONTROL APPARATUS OF TURBOCHARGER

(75) Inventors: Yoshiyuki Ando, Yokohama (JP); Haruo Saito, Yokohama (JP); Takaaki Sekine, Yokohama (JP)

(73) Assignee: Jidosha Denki Kogyo Co., Ltd., Yokohama (JP)

( * ) Notice: Subject to any disclaimer, the term of this patent is extended or adjusted under 35 U.S.C. 154(b) by 0 days.

(21) Appl. No.: 10/776,348

(22) Filed: Feb. 12, 2004

(65) Prior Publication Data

US 2004/0194464 A1 Oct. 7, 2004

(30) Foreign Application Priority Data

Feb. 13, 2003 (JP) ............................ P2003-034633

(51) Int. Cl.
*F02D 23/00* (2006.01)
(52) U.S. Cl. .................................................. 60/602
(58) Field of Classification Search .......... 60/600–603; 415/150
See application file for complete search history.

(56) References Cited

U.S. PATENT DOCUMENTS

| | | | |
|---|---|---|---|
| 6,000,221 A * | 12/1999 | Church et al. | 60/602 |
| 6,062,025 A * | 5/2000 | Okada et al. | 60/602 |
| 6,067,798 A * | 5/2000 | Okada et al. | 60/602 |
| 6,233,934 B1 | 5/2001 | Church et al. | 60/602 |
| 6,354,269 B1 * | 3/2002 | Saito et al. | 60/276 |
| 6,652,414 B1 * | 11/2003 | Banks, III | 60/602 |
| 2002/0100278 A1 | 8/2002 | He et al. | 60/602 |
| 2003/0185672 A1 * | 10/2003 | Suganami et al. | 415/150 |
| 2004/0000143 A1 | 1/2004 | Ahmad | |
| 2004/0011035 A1 | 1/2004 | Arnold | |
| 2004/0182079 A1 * | 9/2004 | Akao et al. | 60/605.2 |

FOREIGN PATENT DOCUMENTS

| | | |
|---|---|---|
| EP | 1304462 A2 * | 4/2003 |
| JP | 2001-107738 | 4/2001 |
| WO | WO 03/036062 A1 | 5/2003 |

OTHER PUBLICATIONS

European Search Report dated Sep. 22, 2004.

* cited by examiner

*Primary Examiner*—Thai-Ba Trieu
(74) *Attorney, Agent, or Firm*—McGinn IP Law Group, PLLC

(57) ABSTRACT

The invention provides a variable nozzle control apparatus for a turbocharger in an engine comprising: a variable nozzle having a vane; an engine ECU for identifying an operating situation of the engine by detected outputs of sensors in the engine and outputting a control signal; and an electronic control actuator for controlling an opening of the vane in response to the control signal transmitted from the engine ECU, wherein the electronic control actuator includes an electronic control circuit section for receiving an opening indication information of the vane from the engine ECU and outputting an output signal; a driving section for receiving the output signal from the electronic control circuit and driving the vane of the variable nozzle through an output shaft; and an angle sensor for detecting a rotation angle of the output shaft to output an actual angle signal of the output shaft to the electronic control circuit.

15 Claims, 3 Drawing Sheets

VARIABLE NOZZLE CONTROL APPARATUS OF TURBOCHARGER

The present application is based on Japanese Patent Application No. 2003-34633, the entire contents of which are incorporated herein by reference.

BACKGROUND OF THE INVENTION

1. Field of the Invention

The present invention relates to a variable nozzle control apparatus of a turbocharger for controlling the opening of the vane of a variable nozzle of a turbocharger mounted on a car by means of an electronic control actuator in response to a control signal transmitted from an engine ECU.

2. Related Art

Conventionally, a technique for controlling the opening of the vane of a variable nozzle of a turbocharger mounted on a car of this type has a structure shown in FIG. 4, for example.

Description will be given to the structure. 1 denotes an engine ECU which is mainly constituted by a microcomputer including a CPU, an ROM, an RAM and an I/O circuit which are well known. The engine ECU 1 includes an electronic control throttle valve capable of variably regulating the amount of air taken into an internal combustion engine (engine) and serves to carry out an operation for opening and closing the electronic control throttle valve. The engine ECU 1 inputs the detection signals of a water temperature sensor, a rotation sensor and a load sensor which are provided in the engine (not shown), and detects an air-fuel ratio, an engine water temperature, an engine speed, an intake air amount and a fuel injection amount. 2 denotes a duty solenoid valve which is provided on the air intake tube side of the engine and serves to introduce air from the atmosphere. The duty solenoid valve 2 regulates an air pressure by an actuator, for example, a negative pressure actuator 3 so that an opening thereof is regulated and the amount of the air taken into the engine is regulated. Moreover, the duty solenoid valve 2 is provided among a pressure chamber, a negative pressure chamber and an atmospheric pressure chamber in the engine and is operated upon receipt of a control signal from the engine ECU 1. On the other hand, the negative pressure chamber of the engine receives and regulates a negative pressure from a vacuum pump 4, thereby operating the negative pressure actuator 3. The vacuum pump 4 circulates oil to carry out an operation. 5 denotes a turbocharger to be a so-called supercharging system of an internal combustion engine which controls the opening of a variable nozzle for causing the flow velocity of an exhaust gas to be variable which is provided in the turbocharger 5 by the operation of the negative pressure actuator 3. In the drawing, 6 denotes a pressure sensor which is provided with a hose 6a placed in the exhaust gas flow path of the turbocharger 5, and the detection signal of the pressure sensor 6 is introduced into the engine ECU 1 through a communication line 6b.

Moreover, another example in the conventional art includes a variable nozzle turbocharger control apparatus of an internal combustion engine which has been disclosed in JP-A-2001-107738, and FIG. 5 shows a structure thereof.

Description will be given to the structure. 7 denotes a turbocharger comprising a center housing, a compressor housing and a turbine housing.

In the compressor housing, an air intake inlet port 7a for introducing air to be supplied to the combustion chamber of an engine 8 is provided in a portion positioned on the opposite side of the center housing. The turbine housing is attached to the other end side of the center housing, and an exhaust gas is sprayed onto the turbine housing and is then fed to a catalyst through an exhaust gas outlet port 7b in the portion positioned on the opposite side of the center housing in the turbine housing. A variable nozzle (not disclosed) provided in the turbocharger 7 is disposed between the center housing and the turbine housing. 9 denotes a stepping motor. By the driving operation of the stepping motor 9, an operating piece 10 is operated to press ring plates provided in the variable nozzles in the same direction, thereby regulating the size of a clearance between the vanes of the mutual variable nozzles. Thus, the flow velocity of the exhaust gas sprayed onto a turbine wheel is regulated. 11 denotes an ECU (electronic control unit) of the engine which serves to input the detected outputs of various sensors provided in the engine, to identify the operation state of the engine based on the detected outputs and to control the driving operation of the stepping motor 9, thereby controlling the opening of the vane of each of the variable nozzles to regulate the flow velocity of the exhaust gas sprayed onto the turbine wheel. Consequently, the amount of air to be fed forcibly for combustion is also regulated.

In the drawing, 12 denotes a radiator which is connected to the engine 8. The cooling water of the engine 8 is circulated in the radiator 12 and is thus cooled. 13 denotes a heater connected to the engine 8 in which the cooling water is heated so that warm air is fed into the interior of the car.

According to the conventional art, the whole position of the variable nozzle is set to be the initial position of the variable nozzle at time of the generation of the abnormality of the variable nozzle turbocharger control apparatus of the internal combustion engine, cold starting, the operation of a heater or idling. Consequently, precision in the control of the position of each nozzle vane in the vicinity of a full-open position can be enhanced, and furthermore, a controllability can be improved in a high rotation and low load operation state.

Since the conventional art has the structure described above, there are the following problems.

More specifically, in the former case of the conventional art, a control signal is generated from the engine ECU 1 and operates the negative pressure actuator 3 through the duty solenoid valve 2, thereby controlling the opening of the variable nozzle coupled to a link mechanism including a lever and a rod in order to control the opening of the variable nozzle provided in the turbocharger 5. The microcomputer constituting the engine ECU 1 is to calculate an air intake pressure, that is, a boost pressure in the supply of air to be taken into the engine to the air intake path. A data map having an engine rotation signal set to be an X axis, a fuel injection amount set to be a Y axis and a target boost pressure set to be a Z axis is stored, and a water temperature signal, a rotation signal and a load signal which are input from the sensor of the engine are read and a target boost pressure suitable for a signal amount is calculated. Furthermore, an actual boost pressure is 6 detected from the pressure sensor 6 to operate the engine ECU 1 in response to an output signal. Accordingly, there is a problem in that the duty solenoid valve 2 and the negative pressure actuator 3 are caused to generate a misarrangement in an operation by precision in the sensor, a temperature drift or the linear interpolation computing error of the data map and the opening of the variable nozzle cannot be controlled properly.

In particular, the position of the negative pressure actuator 3 is determined by a regulated negative pressure amount and the spring pressure of a return spring. There is a problem in that the control software of the engine ECU 1 for carrying out a control operation to have an optimum value, and furthermore, for executing a deciding operation when the negative pressure actuator 3 requires a positive pressure and a negative pressure and the opening of the variable nozzle is improper has a load hysteresis increased remarkably and cannot exhibit a resolution.

Moreover, the engine ECU 1 and the duty solenoid valve 2 are provided in an interior and an engine room, respectively. A control signal line led from the engine ECU 1 to the duty solenoid valve 2 and the negative pressure actuator 3 is long and congested, and a noise is apt to be generated. For this reason, a countermeasure is to be taken against a noise, for example, the control signal line is to be shielded. Furthermore, the specification of the design of the duty solenoid valve 2 is complicated.

In addition, the duty solenoid valve 2 is connected to the negative pressure chamber of the negative pressure actuator 3 through the hose 3*a*, the vacuum pump 4 to be rotated by the engine is connected to the duty solenoid valve 2, and the opening of the variable nozzle communicating with the atmosphere is constituted by mechanical devices, that is, the negative pressure actuator 3 through the hose 3*a*. Consequently, there is a problem in that the hose 3*a*, and furthermore, the vacuum pump 4 are required, resulting in an increase in the size and complexity of a whole system.

In the latter case of the conventional art, as described above, the variable nozzle to be operated by the operating piece 10 is provided in the path for the exhaust gas to be sprayed onto the turbine wheel. The variable nozzle is opened and closed by the ring plate. In the variable turbocharger control apparatus of the internal combustion engine for regulating the flow rate of the exhaust gas, consequently, the initial position of the variable nozzle is determined and the opening of the vane of the variable nozzle is controlled at time of the generation of the abnormality of the variable nozzle turbocharger control apparatus of the internal combustion engine, cold starting, the operation of the heater or the idling of the internal combustion engine. Moreover, the driving operation of the vane of the variable nozzle is carried out by the rotating operation of the stepping motor 9. Consequently, the latter case has almost the same problems as those of the former case in the conventional art.

SUMMARY OF THE INVENTION

The invention has a first object to cause the system or apparatus to comprise an electronic control actuator, to control the electronic control actuator through a control signal line from an engine ECU, to control the opening of the vane of a variable nozzle provided in a turbocharger and to simply calculate the vane opening target position of the variable nozzle by the electronic control actuator to carry out an adaptation and a control to the actual opening position of the valve of the variable nozzle, thereby reducing the load of the software of the engine ECU, eliminating various hoses, and furthermore, forming a control signal line which does not require a countermeasure to be taken against a noise, mounting the electronic control actuator on the turbocharger to reduce a size, automatically deciding whether the opening of the vane of the variable nozzle is suitable or carrying out a comparison processing, enhancing a resolution, and controlling the opening of the vane of the variable nozzle by the electronic control actuator which can be controlled by a feedback signal.

In the driving operation of the system or apparatus, usually, the vane of the variable nozzle is operated within a partial operating angle range in a full operating region. Accordingly, soot adheres to or stays on the surface of a nozzle ring within the operating angle range other than the normal operating region of the vane of the variable nozzle. The invention has a second object to operate the vane to a full open position via a full closing position at least once in the full operating region of the vane of the variable nozzle by status indication information transmitted from the engine ECU based on the stop of an engine which is carried out by the OFF operation of an ignition switch, thereby executing so-called soot sweeping.

In order to attain the objects, the invention has been made and has the following structures and devices.

A first aspect of the invention is directed to a variable nozzle control apparatus of a turbocharger comprising an electronic control actuator for inputting detected outputs from various sensors provided in an engine including a turbocharger having a variable nozzle and controlling an opening of a vane of the variable nozzle of the turbocharger in response to a control signal transmitted from an engine ECU for identifying an operating situation of the engine by the detected outputs of the sensors, wherein the electronic control actuator has a motor section to be a driving source, an output shaft coupled to the motor section through a reduction gear mechanism and coupled to the vane of the variable nozzle of the turbocharger, an angle sensor for detecting a rotation angle of the output shaft to output an actual angle signal of the output shaft, a motor driver for outputting a driving signal to drive the motor section, an angle signal converting device for converting opening indication information of the vane of the variable nozzle which is transmitted from the engine ECU into a target angle signal of the output shaft, a comparing device for comparing the target angle signal of the output shaft which is transmitted from the angle signal converting device with the actual angle signal of the output shaft which is transmitted from the angle sensor, thereby outputting an indication signal corresponding to a difference between both of the signals, a calculating device for carrying out a calculation processing over the indication signal transmitted from the comparing device, and a motor driving logic generating device for inputting an output signal transmitted from the calculating device to the motor driver.

A second aspect of the invention is directed to a variable nozzle control apparatus of a turbocharger comprising an electronic control actuator for inputting detected outputs from various sensors provided in an engine including a turbocharger having a variable nozzle and controlling an opening of a vane of the variable nozzle of the turbocharger in response to a control signal transmitted from an engine ECU for identifying an operating situation of the engine by the detected outputs of the sensors, wherein the electronic control actuator has a motor section to be a driving source, an output shaft coupled to the motor section through a reduction gear mechanism and coupled to the vane of the variable nozzle of the turbocharger, an angle sensor for detecting a rotation angle of the output shaft to output an actual angle signal of the output shaft, a motor driver for outputting a driving signal to drive the motor section, an angle signal converting device for converting opening indication information of the vane of the variable nozzle which is transmitted from the engine ECU into a target angle signal of the output shaft, a comparing device for comparing the target angle signal of the output shaft which is transmitted from the angle signal converting device with the actual angle signal of the output shaft which is transmitted from the angle sensor, thereby outputting an indication signal corresponding to a difference between both of the signals, a calculating device for carrying out a calculation processing over the indication signal transmitted from the comparing device, a motor driving logic generating device for introducing an output signal transmitted from the calculating device into the motor driver, a wiping command device for outputting a command signal to execute a wiping operation for causing the vane to be stopped in a full open position via a full closing position at least once in a full operating region of the vane of the variable nozzle by status indication information transmitted from the engine ECU based on a stop of the engine by an OFF operation of an ignition switch, and a wiping processing device for introducing the command signal of the wiping command device into the motor driving logic generating device.

DETAILED DESCRIPTION OF THE PREFERRED EMBODIMENTS

An embodiment of a variable nozzle control apparatus of a turbocharger according to the invention will be described below in detail with reference to the accompanying drawings.

Figure 1:
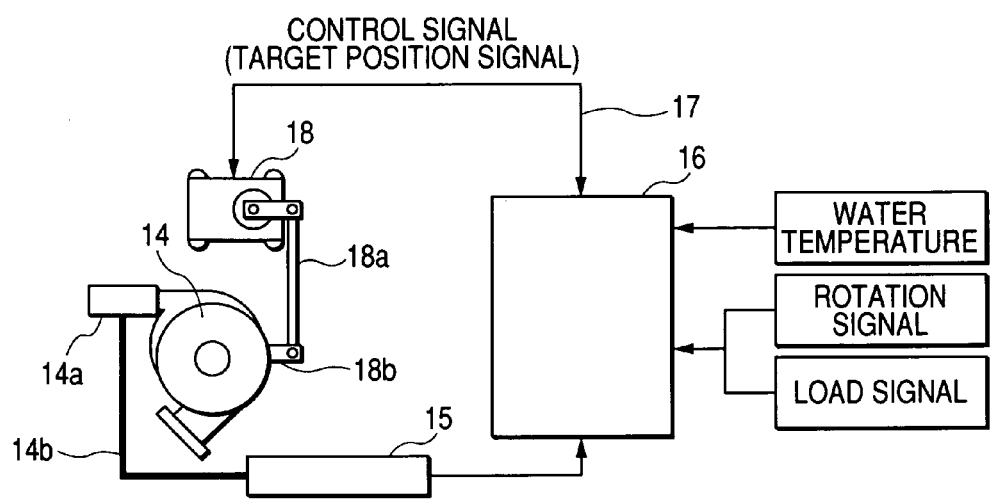
FIG. 1 is a diagram showing the structure of a variable nozzle control apparatus of a turbocharger according to a preferred embodiment of the invention.

FIG. 1 is a diagram showing a structure according to an embodiment of the invention. Description will be given to the structure.

14 denotes a turbocharger to be a system for supercharging intake air to an engine, which is provided with a compressor having a compressor wheel and a turbine (not shown) having a turbine wheel of the turbocharger coupled by a rotor shaft coaxially with the compressor and rotated by an exhaust gas. A pressure sensor 15 for detecting an air intake pressure of the intake air, that is, a boost pressure is connected to an air intake path 14a of the turbocharger 14 through a hose 14b. Moreover, a variable nozzle member is provided in the turbine of the turbocharger 14 in order to surround the turbine wheel.

16 denotes an engine ECU for introducing a water temperature signal, a rotation signal and a load signal, that is, detected outputs from various sensors provided in the engine, for example, a water temperature sensor for detecting the water temperature of the engine, a rotation number sensor for detecting an engine speed and outputting a pulse signal at a constant crank angle, and an accelerator sensor for detecting an intake air amount obtained by an air flow meter and a stepping amount of an accelerator pedal obtained by a driver, thereby calculating a load amount respectively.

In some cases, there are also provided an oxygen sensor for outputting a voltage signal to be varied depending on the oxygen concentration of an exhaust gas and a cylinder internal pressure sensor for detecting a pressure in an engine combustion chamber, which is not shown in FIG. 1.

The operation state of an engine is identified based on these detected outputs to control the driving operation of an electronic control actuator 18 through a control signal line 17. The electronic control actuator 18 has a lever 18a and a rod 18b coupled thereto and controls a variable nozzle member (not shown) provided in the turbocharger 14 by the operation.

Figure 2:
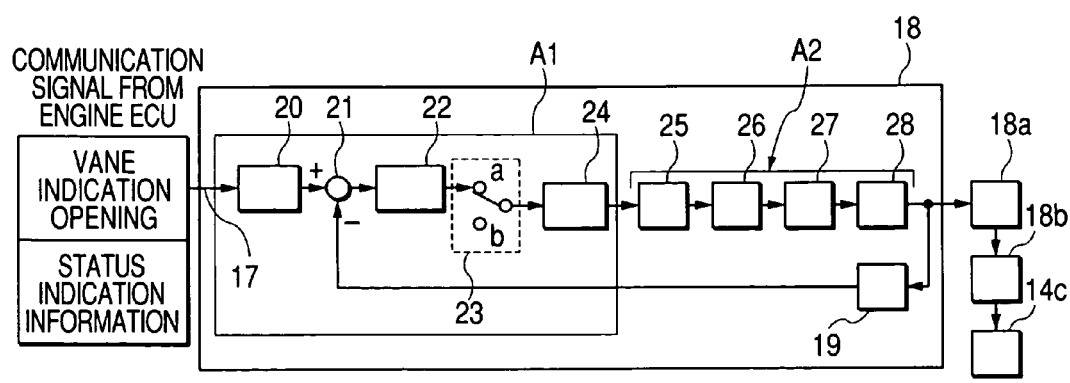
FIG. 2 is a block diagram showing an embodiment of the variable nozzle control apparatus of the turbocharger according to the invention, illustrating a first example of an electronic control actuator.

As shown in FIG. 2, the electronic control actuator 18 is generally constituted by an electronic control circuit section A1 and a driving section A2 which is controlled to be driven by the electronic control circuit section A1, and has an angle sensor 19 for detecting the rotation angle of the output shaft of the driving section A2. The electronic control circuit section A1 is connected to the engine ECU 16 through the control signal line 17. The engine ECU 16 carries out a calculation processing control by information (signals) transmitted from sensors provided in various engines.

The electronic control actuator 18 is attached to the end of the cylinder block of the engine, for example.

EXAMPLE

Next, an example of the variable nozzle control apparatus of the turbocharger according to the invention and an operation thereof will be described with reference to FIGS. 2 and 3.

FIG. 2 is a block diagram showing a first example of the variable nozzle control apparatus of the turbocharger according to the invention. Description will be given to the first example.

The electronic control actuator 18 comprises an electronic control circuit section A1 and a driving section A2. The actual angle signal of an output shaft is fed back from the output side of the driving section A2 to the comparing device of the electronic control circuit section A1 through an angle sensor 19. In the electronic control circuit section A1, an angle signal converting device 20, a comparing device 21, a calculating device 22 constituted by a PID calculating section, a change-over switch 23 and a motor driving logic generating device 24 are sequentially connected, various communication information, particularly, the opening indication information of a vane 14c of the variable nozzle are fetched from the engine ECU 16 via the control signal line 17 based on the starting operation of the engine, and the same information or signals are subjected to a processing calculation and are thus output to the driving section A2 provided in a subsequent stage. The driving section A2 to be operated by the output signal comprises a motor driver 25 which is operated in response to the output signal of the motor driving logic generating device 24, a motor section 26 to be a driving source, a reduction gear mechanism 27 and an output shaft 28 of the electronic control actuator 18, and sequentially operates them.

The actual angle signal of the output shaft is detected as the rotation angle of the output shaft 28 by the angle sensor 19 and is introduced into the comparing device 21. The calculating device 22 provided on the output side of the comparing device 21 is constituted by a PID calculating section, for example, and serves to compare the target angle signal of the output shaft 28 with the actual angle signal of the output shaft 28 by the comparing device 21 and to integrate, differentiate and proportionally control them to carry out a fine processing calculation. Since such the devices are used, the responsiveness of the electronic control actuator 18 can be enhanced very greatly.

Next, the output of the electronic control actuator 18 is transmitted to the variable nozzle member of the turbocharger 14 through the lever 18a and the rod 18b, thereby controlling the opening of the vane 14c of the variable nozzle provided in the variable nozzle member.

According to the apparatus of the invention, thus, the rotation angle of the output shaft 28 coupled to the vane 14c of the variable nozzle is detected by the angle sensor 19, thereby outputting the actual angle signal of the output shaft, and the opening indication information of the vane 14c of the variable nozzle which is transmitted from the engine ECU 16 is converted into the target angle signal of the output shaft by the angle signal converting device 20, and both of the signals are compared with each other and the vane 14c of the variable nozzle is driven and controlled to have a target opening corresponding to a difference between both of the signals. Consequently, it is possible to obtain the variable nozzle control apparatus of the turbocharger in which the decision of the suitability of the opening of the vane 14c in the variable nozzle or a comparison processing can be automatically carried out, and a resolution can be enhanced and a control can be performed by a feedback signal.

Moreover, the load of the software of the engine ECU can be reduced and various hoses required for conventional apparatuses are not necessary, and the length of the control signal line can be decreased and a special countermeasure does not need to be taken against a noise. Furthermore, the size of the actuator 18 can be decreased so that the size of the whole apparatus can be reduced.

Figure 3:
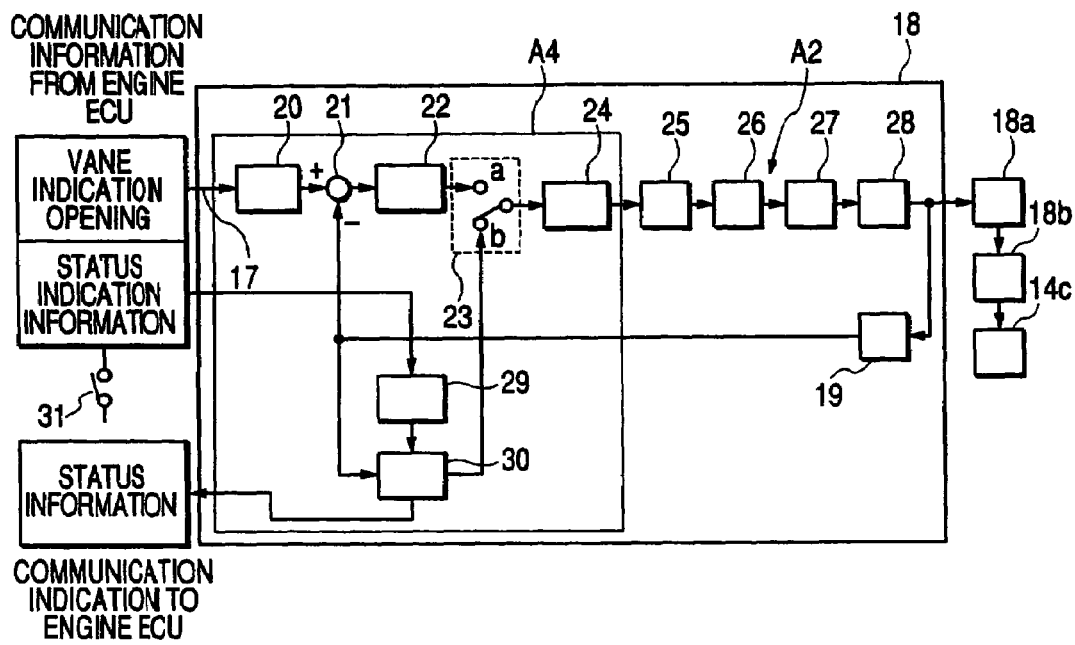
FIG. 3 is a block diagram showing an embodiment of the variable nozzle control apparatus of the turbocharger according to the invention, illustrating a second example of the internal structure of the electronic control actuator.
Figure 4:
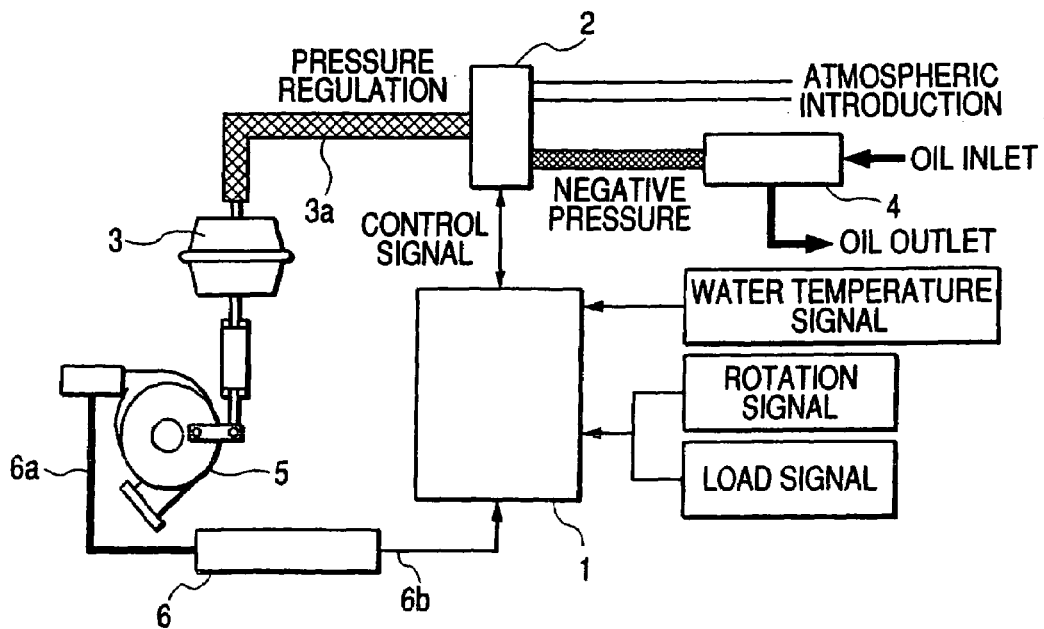
FIG. 4 is a diagram showing the structure of a variable nozzle control apparatus of a turbocharger according to a conventional example.
Figure 5:
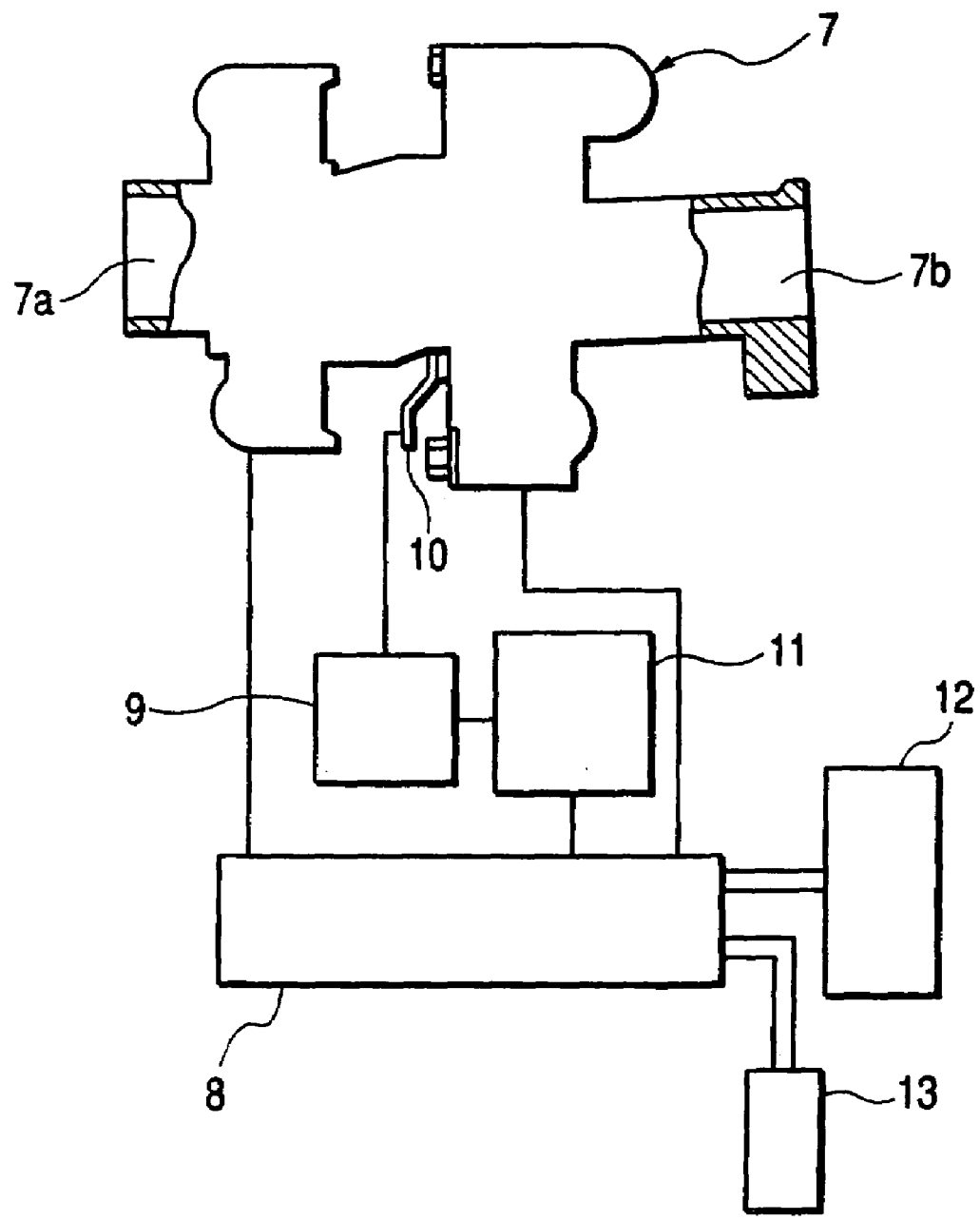
FIG. 5 is a diagram showing the structure of a variable nozzle control apparatus of a turbocharger according to another conventional example.

FIG. 3 is a block diagram showing a second example of the variable nozzle control apparatus of the turbocharger according to the invention. Description will be given to the second example. FIG. 3 is a diagram showing a structure in which a function of causing the vane 14c of the variable nozzle to carry out a wiping operation is added to the structure of the block circuit in FIG. 2.

The electronic control actuator 18 comprises an electronic control circuit section A4 and the driving section A2. The driving section A2 and the other structures are the same as those in the first example and description thereof will be omitted. Moreover, the structure of the electronic control circuit section A4 is the same as that of the electronic control circuit section A1 except that wiping command device and wiping processing device which will be described below are added. The electronic control circuit section A4 includes a wiping command device 29 and a wiping processing device 30. The wiping command device 29 outputs a wiping operation command signal for executing the wiping operation of the vane 14c over the whole operating region of the vane 14c of the variable nozzle provided in the variable nozzle member by status indication information transmitted from the engine ECU 16 based on the stop of the engine of a car upon receipt of an OFF signal transmitted from an engine key switch, that is, an ignition switch 31. The wiping processing device 30 introduces the wiping operation command signal into the motor driving logic generating device 24. The motor driver 25 rotates the motor section 26 in response to an output signal transmitted from the motor driving logic generating device 24, thereby executing the wiping operation of the vane 14c of the variable nozzle. When the wiping operation of the vane 14c of the variable nozzle is ended, the wiping processing device 30 transmits, as status information, a signal indicative of the end to the engine ECU 16.

In many cases, the vane 14c of the variable nozzle is usually operated within a part of a whole operating region having an opening angle of 0 to 100 degrees, for example, only an operating angle range having an opening angle of 30 to 60 degrees. In some cases, accordingly, soot adheres to or stays on the surface of a nozzle ring within the operating angle range other than the normal operating region of the vane 14c of the variable nozzle. According to the example, when the ignition switch 31 is OFF, the wiping operation for stopping the vane 14c of the variable nozzle in a full open position via a full closing position at least once is executed. Therefore, so-called soot sweeping is carried out and the operation of the vane 14c of the variable nozzle or the variable nozzle member can be smoothly carried out and a durability can be enhanced, and furthermore, the flow efficiency of an exhaust gas or the operation efficiency of the vane 14c itself of the variable nozzle can be improved and the opening of the vane 14c of the variable nozzle can be properly controlled.

The other structures and operations are almost the same as those in the first example and description thereof will be omitted.

Since the variable nozzle control apparatus of the turbocharger according to the invention has the structure and operation described above, the following advantages can be obtained.

According to the first aspect of the invention, the rotation angle of the output shaft coupled to the vane of the variable nozzle is detected by the angle sensor to output the actual angle signal of the output shaft, and the opening indication information of the vane of the variable nozzle transmitted from the engine ECU is converted into the target angle signal of the output shaft by the angle signal converting device, both of the signals are compared with each other and the vane of the variable nozzle is driven according to a difference between both of the signals, thereby controlling the vane to have a target opening. Consequently, it is possible to obtain a variable nozzle control apparatus of a turbocharger capable of automatically carrying out the decision of the suitability of the opening of the vane in the variable nozzle or a comparison processing, enhancing a resolution, and performing a control in response to a feedback signal moreover, it is possible to obtain such an advantage that the size of the actuator can be decreased so that the size of the whole apparatus can be reduced.

According to the second aspect of the invention, in addition to the advantages according to the first aspect of the invention, the vane is operated up to the full open position via the full closing position at least once in the whole operating region of the vane of the variable nozzle by the status indication information transmitted from the engine ECU based on the stop of the engine according to the OFF operation of the ignition switch. Therefore, it is possible to obtain such an advantage that so-called soot sweeping can be executed, the operation of the vane of the variable nozzle can be smoothly carried out and a durability can be enhanced.

What is claimed is:

1. An electronic controller for a variable nozzle control apparatus comprising:
    an angle sensor that detects a rotation angle of an output shaft, which drives a vane of a variable nozzle, and that outputs an actual angle signal;
    an electronic control circuit that receives a vane opening signal from an engine electronic control unit and that provides an output signal based upon the vane opening signal and the actual angle signal; and
    a driver that drives the output shaft based upon the output signal, wherein said electronic control circuit comprises a wiping commander that outputs a wiping command to cause the variable nozzle to execute a wiping operation.

2. The controller of claim 1, wherein said electronic control circuit comprises an angle signal converter that converts the vane opening signal into a target angle signal.

3. The controller of claim 1, wherein the wiping operation comprises positioning the vane in a full open position.

4. The controller of claim 1, wherein the wiping operation comprises positioning the vane in a full closed position.

5. The controller of claim 1, wherein the wiping operation comprises moving the vane through a full operating range.

6. The controller of claim 1, wherein the wiping commander outputs the wiping command in response to an indicator signal from the engine electronic unit that indicates an engine stop.

7. The controller of claim 1, wherein said electronic control circuit further comprises a wiping processor that introduces the wiping command to a motor driver.

8. The controller of claim 7, wherein said wiping processor further transmits a status signal indicating an end of a wiping operation to the engine electronic control unit.

9. The controller of claim 1, wherein the electronic control circuit comprises a proportional/integral/derivative calculator.

10. The controller of claim 1, wherein said driver comprises:
   a motor including a motor output shaft; and
   a reduction gear connected to said motor output shaft that provides a rotation speed at a reduction gear output shaft that is less than said motor output shaft.

11. The controller of claim 10, wherein said angle sensor detects a rotation angle of said reduction gear output shaft.

12. A variable nozzle control apparatus adapted for a turbocharger in an engine comprising:
   a variable nozzle having a vane;
   an engine electronic control unit for identifying an operating situation of the engine by detected outputs of sensors in the engine and outputting an opening indication information of the vane; and
   an electronic control actuator for controlling an opening of the vane in response to the an opening indication information of the vane transmitted from the engine electronic control unit,
   wherein the electronic control actuator comprises:
      an electronic control circuit section for receiving the an opening indication information of the vane from the engine electronic control unit and outputting an output signal;
      a driving section for receiving the output signal from the electronic control circuit section and driving the vane of the variable nozzle through an output shaft; and
      an angle sensor for detecting a rotation angle of the output shaft to output an actual angle signal of the output shaft to the electronic control circuit,
   wherein the electronic control circuit section comprises:
      an angle signal converting device for converting the an opening indication information of the vane into a target angle signal of the output shaft,
      a comparing device for comparing the target angle signal from the angle signal converting device with the actual angle signal from the angle sensor, and outputting an indication signal corresponding to a difference between the target signal and the actual signal,
      a calculating device for carrying out a calculation processing over the indication signal transmitted from the comparing device, and
      a motor driving logic generating device for inputting the output signal to a motor driver of the driving section wherein the electronic control circuit section further comprises:
      a wiping command device for outputting a command signal to execute a wiping operation for causing the vane to be stopped in a full open position via a full closing position at least once in a full operating region of the vane of the variable nozzle by a status indication information transmitted from the engine electronic control unit based on a stop of the engine by an OFF operation of an ignition switch; and
      a wiping processing device for introducing the command signal of the wiping command device into the motor driving logic generating device.

13. A variable nozzle control apparatus adapted for a turbocharger in an engine comprising:
   a variable nozzle having a vane;
   an engine electronic control unit for identifying an operating situation of the engine by detected outputs of sensors in the engine and outputting an opening indication information of the vane; and
   an electronic control actuator for controlling an opening of the vane response to the an opening indication information of the vane transmitted from the engine electronic control unit,
   wherein the electronic control actuator comprises:
      an electronic control circuit section for receiving the an opening indication information of the vane from the engine electronic control unit and outputting an output signal;
      a driving section for receiving the output signal from the electronic control circuit section and driving the vane of the variable nozzle through an output shaft; and
      an angle sensor for detecting a rotation angle of the output shaft to output an actual angle signal of the output shaft to the electronic control circuit, wherein the electronic control circuit section comprises:
      an angle signal converting device for converting the an opening indication information of the vane into a target angle signal of the output shaft,
      a comparing device for comparing the target angle signal from the angle signal converting device with the actual angle signal from the angle sensor, and outputting an indication signal corresponding to a difference between the target signal and the actual signal,
      a calculating device for carrying out a calculation processing over the indication signal transmitted from the comparing device, and
      a motor driving logic generating device for inputting the output signal to a motor driver of the driving section,
   wherein the driving section comprises:
      the motor driver for receiving the output signal from the electronic control circuit and outputting a driving signal; and
      a motor section driven by the driving signal and coupled to the output shaft though a reduction gear mechanism, and the output shaft driving the vane of the variable nozzle.

14. The apparatus of claim 13, wherein the driving section comprises:
   a motor including a motor output shaft; and
   a reduction gear connected to said motor output shaft that provides a rotation speed at a reduction gear output shaft that is less than said motor output shaft.

15. The apparatus of claim 14, wherein said angle sensor detects a rotation angle of said reduction gear output shaft.

* * * * *